(12) United States Patent
Krantz (10) Patent No.: US 7,878,600 B2
(45) Date of Patent: Feb. 1, 2011

(54) MECHANICAL FASTENER FOR POLYURETHANE WHEELS

(75) Inventor: Gregory Michael Krantz, Williams Bay, WI (US)

(73) Assignee: Stellana U.S. Inc., Lake Geneva, WI (US)

( * ) Notice: Subject to any disclaimer, the term of this patent is extended or adjusted under 35 U.S.C. 154(b) by 223 days.

(21) Appl. No.: 11/758,607

(22) Filed: Jun. 5, 2007

(65) Prior Publication Data

US 2008/0303337 A1 Dec. 11, 2008

(51) Int. Cl.
A63C 17/22 (2006.01)

(52) U.S. Cl. .................. 301/5.306; 301/5.309; 152/323; 152/379.3

(58) Field of Classification Search ... 301/5.301–5.309; 152/5, 7, 40, 47–48, 50–52, 246, 302–303, 152/323, 379.3, 393–394
See application file for complete search history.

(56) References Cited

U.S. PATENT DOCUMENTS

| | | | | |
|---|---|---|---|---|
| 1,130,794 | A | * | 3/1915 | Clark ....................... 301/5.307 |
| 1,310,287 | A | * | 7/1919 | Millet ...................... 301/5.304 |
| 2,083,766 | A | | 6/1937 | Wittkopp |
| 2,770,868 | A | | 11/1956 | Streckfus et al. |
| 4,114,952 | A | | 9/1978 | Kimmell |
| 4,900,095 | A | | 2/1990 | Brubaker |
| 4,944,563 | A | | 7/1990 | Pinchbeck et al. |
| 5,527,100 | A | * | 6/1996 | O'Donnell et al. ....... 301/5.309 |
| 6,286,572 | B1 | | 9/2001 | Chen |
| 6,467,519 | B1 | | 10/2002 | Owen |
| 6,796,617 | B2 | * | 9/2004 | Black ....................... 301/5.306 |
| 2005/0179310 | A1 | * | 8/2005 | Miller ...................... 301/5.308 |
| 2005/0257871 | A1 | | 11/2005 | Hill, III et al. |
| 2006/0027298 | A1 | | 2/2006 | Han |

FOREIGN PATENT DOCUMENTS

| | | |
|---|---|---|
| AU | 5786299 | 3/2001 |
| CA | 2261492 | 7/2000 |
| DE | 1480941 | 3/1969 |
| DE | 2510519 | 9/1976 |
| DE | 2913113 | 10/1980 |
| DE | 4338612 | 1/1995 |
| FR | 2616352 | 12/1988 |
| GB | 475987 | 11/1937 |
| WO | WO0114154 | 3/2001 |

* cited by examiner

*Primary Examiner*—Jason R Bellinger
(74) *Attorney, Agent, or Firm*—Jansson Shupe & Munger Ltd.

(57) ABSTRACT

Wheels including one or more retention elements for affixing a polyurethane tire to a hub of the wheel are disclosed. The polyurethane tires of the wheels disclosed are manufactured separate from the hub and affixed to the hub via the retention elements thereby enabling additional manufacturing processes for the polyurethane tires and reuse of the hub portion of the wheels. Such manufacturing processes also allow for more complex polyurethane tire design and combinations of polymers to produce composite wheels allowing for increased comfort and durability. The wheels are particular suitability for use with industrial vehicles, such as lift trucks.

19 Claims, 6 Drawing Sheets

MECHANICAL FASTENER FOR POLYURETHANE WHEELS

CROSS-REFERENCE TO RELATED APPLICATIONS

Not applicable.

BACKGROUND

Conventional polyurethane wheels are manufactured by coating a steel hub with an adhesive layer, placing the hub in a mold, and pouring liquid polyurethane into the mold where the adhesive layer bonds the polyurethane to the steel hub. The adhesive layer may include an epoxy, phenolic, or urethane layer, for example. When manufacturing a wheel in this manner, the polyurethane and adhesive layer are typically cured together at a specific temperature. For proper curing to occur, the wheel assembly must reach a uniform temperature. Large wheels, for example up to 300 lbs. (136 kg) or more, are especially difficult to cure because of their large thermal inertia.

However, the adhesive-enabled bond between the polyurethane tire and the hub fails at an unacceptable rate. Moreover, manufacturers cannot reliably determine whether a particular bonded wheel, or batch of bonded wheels, will fail because the quality of the bond cannot be verified during manufacture.

Aside from manufacturing issues, dissipation of heat during use of wheels is also of concern. Bonds between a hub and a wheel fail because of a property called hysteresis. Hysteresis occurs during heavy loads on the wheel whereby the polyurethane tire heats up and melts near the hub, causing the polyurethane tire to slip, or tear, off of the hub. To mitigate hysteresis, larger forklifts sometimes use tires with grooves where loads and operating conditions are extreme. The purpose of the grooves is to release heat in order to prevent tire failure due to hysteresis. To mitigate the problem of hysteresis with polyurethane tires, other materials, such as rubber, have been used.

Using rubber tires may mitigate the hysteresis problem, but rubber tires are an unsatisfactory substitute to polyurethane tires in many applications, such as with lift trucks. In such applications, polyurethane tires do not wear as fast as rubber tires, have a higher weight capacity than rubber tires, have reduced rolling resistance resulting in prolonged battery life, and exhibit superior abrasion and chemical resistance as opposed to rubber tires. Moreover, as a result of the higher weight capacity, most electric lift trucks require polyurethane tires because of the additional weight of the batteries used to power the lift and propel the lift truck. Therefore, for many types of lift trucks, and other applications, polyurethane tires may be required.

Another disadvantage of polyurethane tires is that they are made of a harder compound than rubber tires, making an operator's ride more uncomfortable, particularly on uneven ground. Moreover, in such conventional polyurethane wheels, a user replaces a polyurethane tire by replacing the entire polyurethane tire/metal hub combination as a result of the bond between the tire and hub thereby wasting the hub where only the polyurethane tire is worn.

Therefore, there is a need for an improved means for affixing polyurethane tires to a hub so that the polyurethane tire may be replaced while allowing the metal hub to be reused. Moreover, there is a need for improved manufacturing processes for producing polyurethane wheels.

BRIEF SUMMARY OF SEVERAL EXAMPLE EMBODIMENTS

A wheel for supporting an industrial vehicle is disclosed. The wheel includes a tire and a hub. The tire is at least partially formed of polyurethane and has an inner diameter and an outer diameter. The hub includes an annular portion having an outer diameter about equal to the inner diameter of the tire. The hub further includes one or more retention elements configured to releasably mount the tire to the hub.

According to several embodiments, a wheel configured to support a lift truck includes a tire and a hub. The tire is at least partially formed of polyurethane and has an inner diameter and an outer diameter. The tire is configured to support at least about 1000 pounds. The hub includes an annular portion having an outer diameter about equal to the inner diameter of the tire. The wheel includes means for releasably mounting the tire to the hub. A surface on the tire also corresponds to a surface on the hub. The corresponding surfaces of the tire and the hub are configured to oppose relative motion between the tire and the hub.

A method for manufacturing a wheel is also disclosed. The method includes molding a tire at least partially formed of polyurethane, the tire having an outer diameter and an inner diameter. The method further includes providing a hub. The hub includes an annular portion having an outer diameter about equal to the inner diameter of the tire. The method further includes mounting the tire about an outer surface of the hub, wherein the act of molding the tire is performed prior to the act of mounting the tire to the hub.

These and other aspects of the present invention will become more fully apparent from the following description and appended claims, or may be learned by the practice of the invention as set forth hereinafter.

BRIEF DESCRIPTION OF THE DRAWINGS

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion with details that would be known to one of ordinary skill in the art.

Unlike conventional polyurethane tires, the inventive wheels disclosed herein include means for releasably mounting a polyurethane tire to a hub. The means for releasably mounting a polyurethane tire to a hub can be implemented as a retention element, such as a plate, ring, tab, finger, clip, or other structure, that is removable from, or is coupled to, the hub to operatively retain the polyurethane tire about an outer surface of the hub. The retention element may be releasably attached to the hub in that it attaches to the hub or is configured to be released from a position at which it retains the tire about an annular portion of the hub, for example by pivoting out of a position in which it retains the tire on the hub.

In some embodiments, the retention element includes one or more plates removably attached to the sides of the hub and extending over at least a portion of the polyurethane tire. As such, the polyurethane tire is substantially prevented from slipping off of a side of the hub but allows for removal of the polyurethane tire when at least one of the plates is removed from the side of the hub.

The inventive tires can further include one or more surfaces on the tire corresponding to one or more surfaces on the hub. The corresponding surfaces of the tire and hub are configured to oppose relative motion between the tire and the hub. In some embodiments, the corresponding surfaces include serrations, interlocking structures, and/or are associated with a frictional force that opposes relative motion between the tire and the hub. The plates used to retain the polyurethane tire about the hub may also be configured to squeeze the polyurethane tire, thereby opposing relative motion between corresponding surfaces of the polyurethane tire and the plates due to increased static friction between the corresponding surfaces of the plates and polyurethane tire in contact.

The polyurethane tires are cured in a mold that gives the tire its usable shape. The polyurethane tire is formed in a mold independent of the hub, and only after the polyurethane tire is formed, will the polyurethane tire and hub be assembled together. Molding a polyurethane tire separate from the hub enables more complex structural tire and hub surfaces according to several embodiments.

Figure 1A:
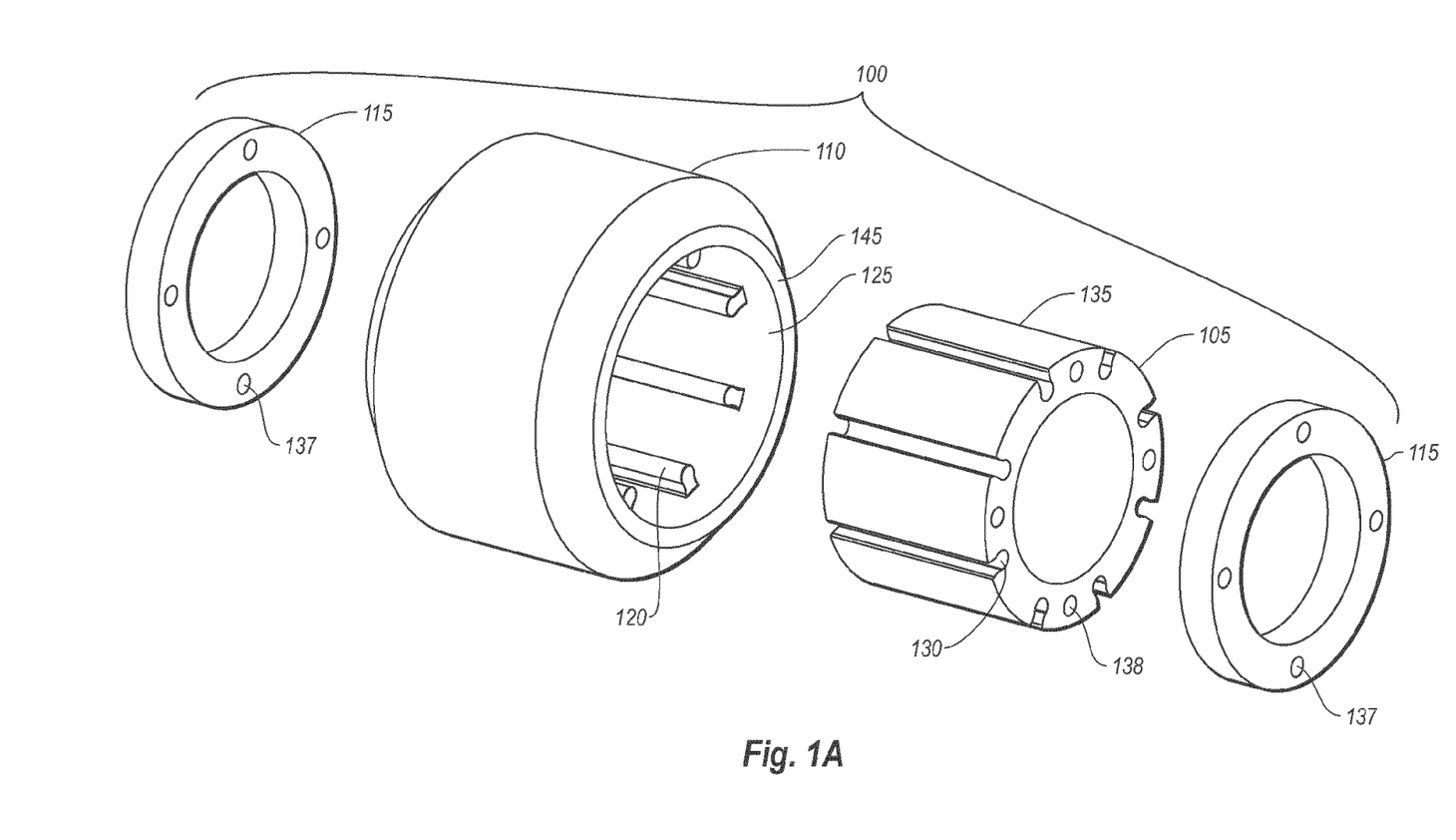
FIGS. 1A, 1B, and 1C disclose a wheel that includes one or more retention elements to releasably mount a polyurethane tire to a hub.
Figure 1B:
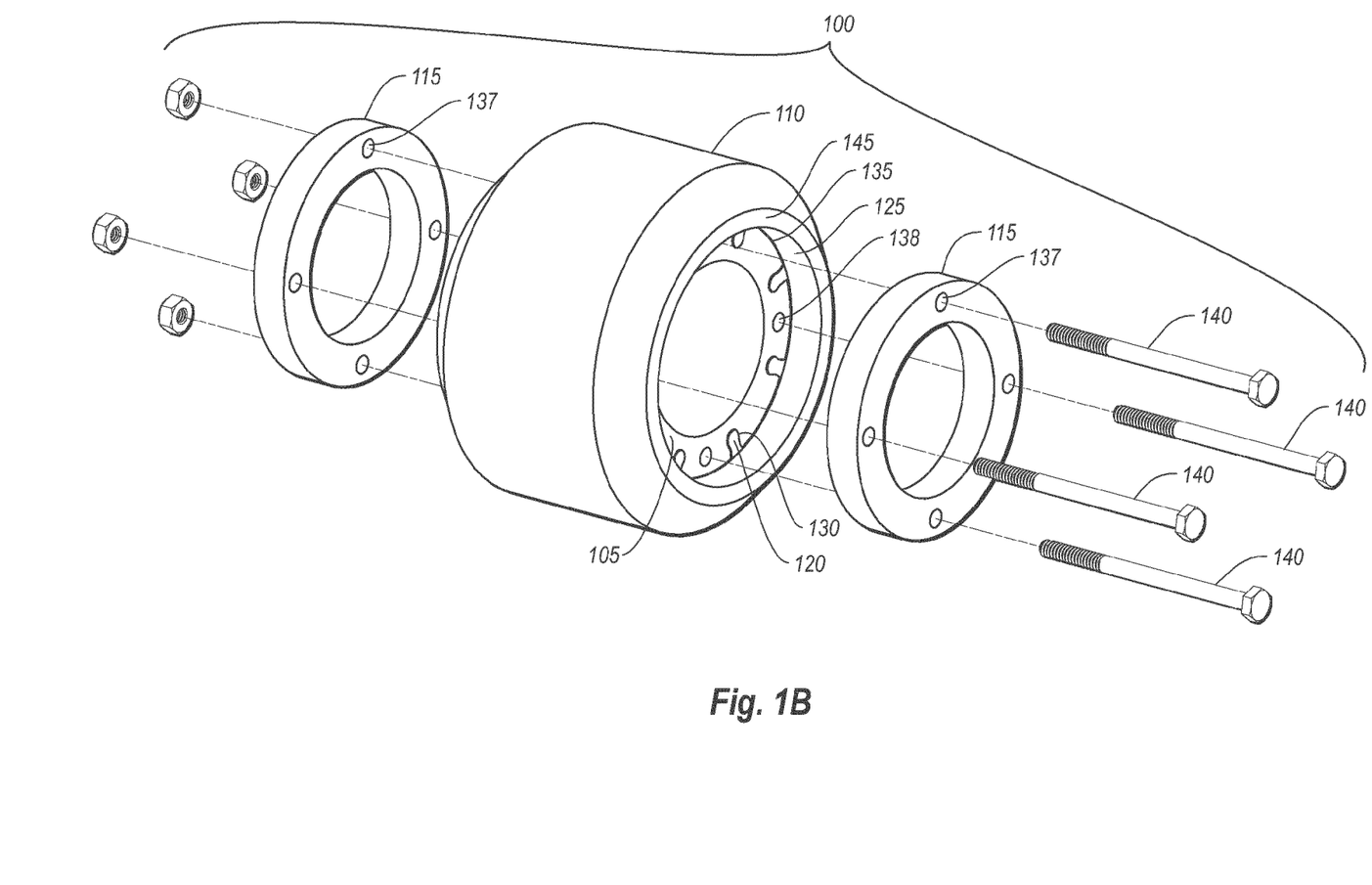
Figure 1C:
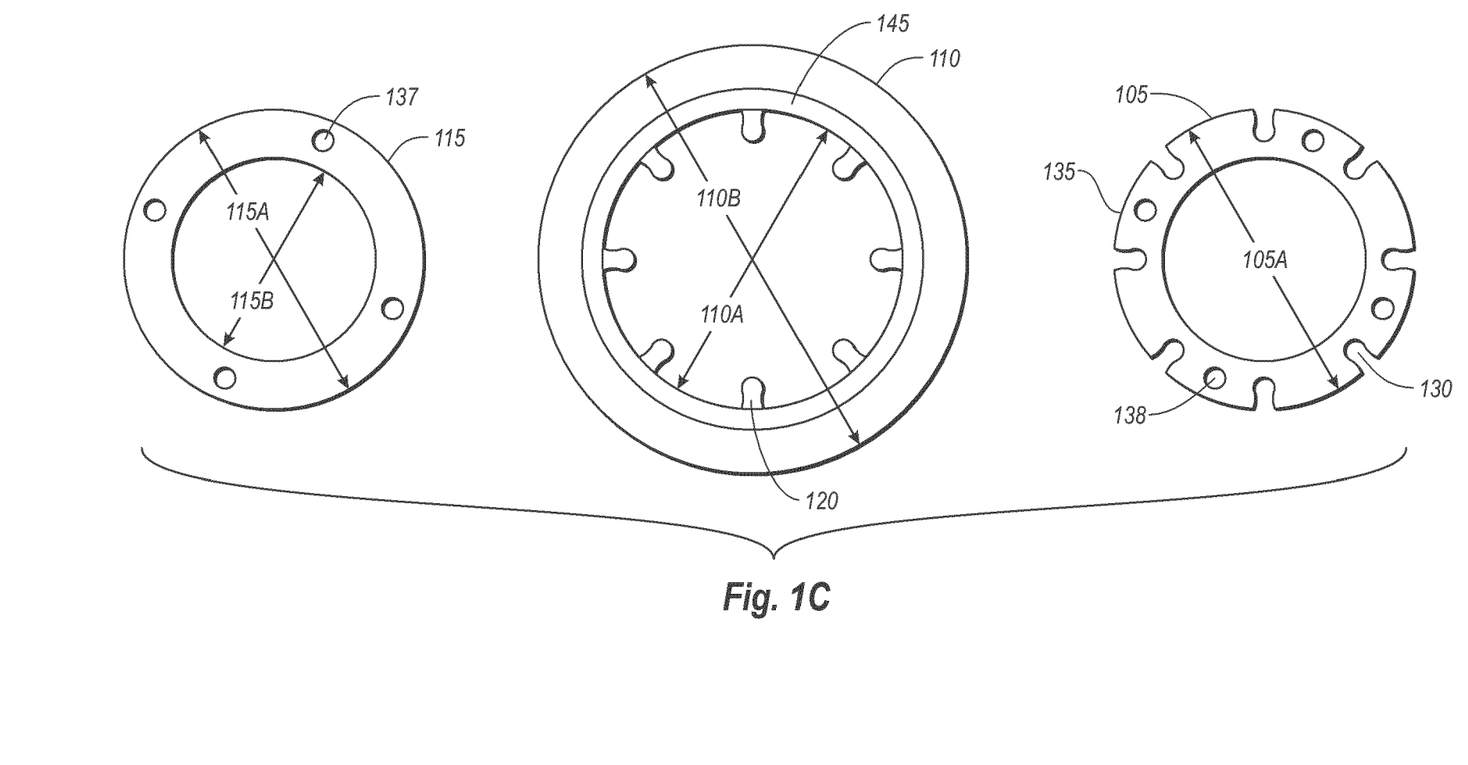

For example, referring to FIGS. 1A, 1B, and 1C, a wheel 100 is illustrated that includes means for releasably mounting a polyurethane tire 110 to a hub 105 when the polyurethane tire 110 is received about an outer surface of the hub 105. In this embodiment, the wheel 100 defines an inner diameter 110A and an outer diameter 110B (see FIG. 1C). The hub 105 includes an annular portion having an outer diameter 105A about equal to an inner diameter 110A of the polyurethane tire 110. In interference fit embodiments, the outer diameter 105A of the hub 105 is slightly larger than the inner diameter 110A of the polyurethane tire 110. In this embodiment, the means for releasably mounting a polyurethane tire 110 to a hub 105 is implemented as two retention elements 115. In this example, the retention elements 115 are embodied by ring-shaped plates configured to attach to the sides of the hub 105. The retention elements 115 are configured to substantially prevent the polyurethane tire 110 from slipping off of the sides of the hub 105 when the polyurethane tire is mounted to the hub 105.

The wheel 100 can also include corresponding surfaces disposed on the hub 105 and tire 110. The corresponding surfaces are configured to oppose relative motion between the tire 110 and the hub 105. For example, in the embodiment shown in FIGS. 1A, 1B, and 1C the polyurethane tire 110 and hub 105 define corresponding surfaces 125 and 135 with respective interlocking elements. In this example, the polyurethane tire 110 includes several keys 120 disposed on an inner surface 125 of the polyurethane tire 110. The keys 120 can have a uniform or non-uniform shape. For example, as illustrated in FIGS. 1A, 1B, and 1C, the keys 120 can have a first width near the inner surface 125 of the polyurethane tire that is less than a second width near the opposite end of the keys 120.

The hub 105 can have one or more cavities in the form of slots 130, each of which is configured to interlock with a corresponding key 120 of the polyurethane tire 110 so as to opposing relative motion between the tire 110 and the hub 105. The keys 120 and slots 130 may be disposed in a linear or non-linear, e.g. spiral, fashion across a width, respectively, of the inner surface 125 of the polyurethane tire 110 and the corresponding outer surface 135 of the annular portion of the hub 105. Other geometries, spacing, numbering, and locations of interlocking elements can also be implemented. The hub 105 may be made of any material capable of supporting the polyurethane tire 110. For example, the hub 105 may be at least partially made out of a metal, such as steel.

After the polyurethane tire 110 is mounted to the hub 105, the retention elements 115 are attached to the sides of the hub 105. The retention elements 115 and hub 105 can include several through holes 137 and 138 configured such that bolts 140 (see FIG. 1B) or other means for attaching the retention elements 115 to the hub 105 can be used. The retention elements 115 are attached to the sides of the hub 105 by the bolts 140 so that the polyurethane tire 110 may or may not be compressed, thereby releasably attaching the polyurethane tire 110 to the hub 105.

As illustrated in FIG. 1C, the retention elements 115 can have an annular shape that is defined by an outer diameter 115A and inner diameter 115B. In this embodiment, the outer diameter 115A of the retention elements 115 can be about equal to the inner diameter 110A of the polyurethane tire 110. Thus, the retention elements 115 extend over the one or more keys 120 thereby substantially preventing the polyurethane tire 110 from slipping off of the hub 105.

The retention elements 115 can also extend over a portion of a sidewall 145 of the polyurethane tires 110. For example, the outer diameter 115A of the retention elements 115 can be larger than the inner diameter 110A of the polyurethane tire 110 such that a portion of the retention elements 115 extends beyond the one or more keys 120 and over a portion of the sidewall 145 of the polyurethane tire 110. In this embodiment, the polyurethane tire 110 is substantially prevented from slipping off of the sides of the hub 105 due to an overlap of the retention elements 115 over both the keys 120 and a portion of the sidewall 145 of the polyurethane tire 110.

In this embodiment, the surfaces of the retention elements 115 in contact with the sidewalls of the polyurethane tire 110 may also be considered corresponding surfaces. Particularly, the retention elements 115 are biased against the sidewalls 145 of the polyurethane tire 110. The bias force between the retention elements 115 and the sidewalls 145 increases static friction between the retention elements 115 and the sidewalls 145, thereby opposing relative motion between the polyurethane tire 110 and the hub 105.

According to another embodiment, one of the retention elements 115 may be manufactured integrally with, or permanently attached to the hub 105. In this embodiment, only one of the retention elements 115 need be removable from the hub 105 in order to remove the polyurethane tire 110 from the hub 105.

Figure 2A:
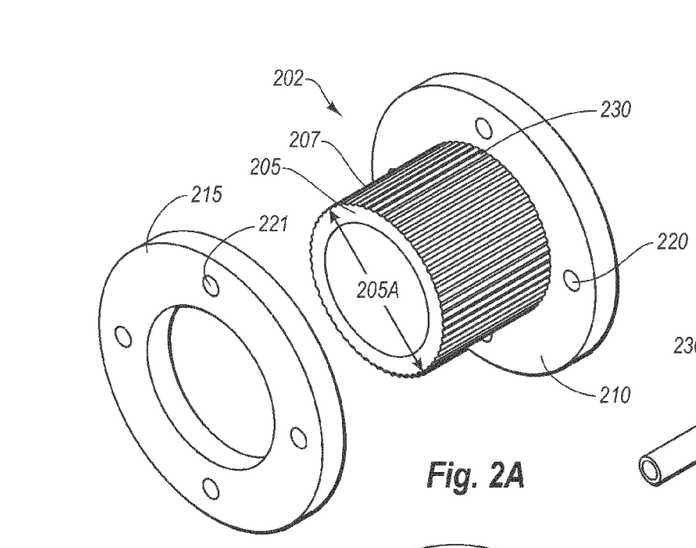
FIGS. 2A, 2B, and 2C disclose a wheel that incorporates one or more retention elements configured to releasably mount a polyurethane tire to the hub.
Figure 2B:
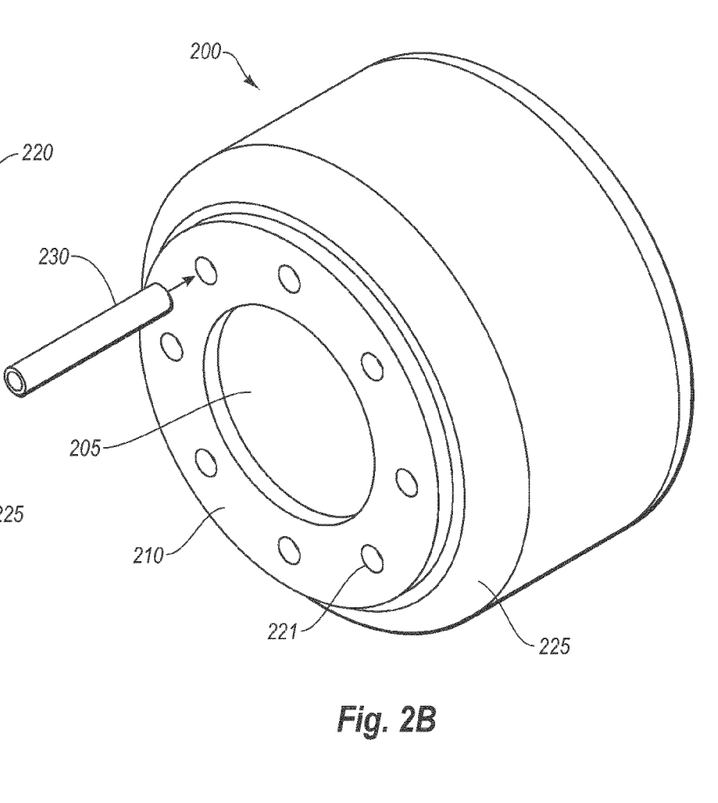
Figure 2C:
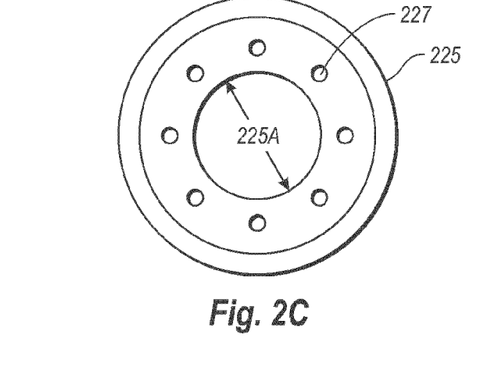

Other configurations of corresponding surfaces may be used to oppose relative motion between the polyurethane tire and the hub. For example, serrations disposed the hub, or an interference fit between corresponding surfaces of the hub and the tire may be implemented to oppose relative movement between the polyurethane tire and the hub. Referring to FIGS. 2A, 2B, and 2C, a wheel 200 is illustrated that includes a hub 202 and a polyurethane tire 225 according to an example embodiment. The hub 202 includes means for releasably mounting the polyurethane tire 225 to the hub 200 when the polyurethane tire 225 is received about an outer corresponding surface 207 of the hub 202. In this embodiment, the hub 200 includes an annular portion 205 having an outer diameter 205A (see FIG. 2A) about equal to an inner diameter 225A of the polyurethane tire 225 (see FIG. 2C). The hub 200 further includes a first radially extending retention element 210 integrally formed with, or permanently attached to, the annular extending portion 205 of the hub 200. The hub 200 further includes a second retention element 215 configured to releasably attach to the hub 200 such that the polyurethane tire 225 is releasably retained about the annular portion 205 of the hub 200 when the second retention element 215 is releasably attached to the hub 202.

The first retention element 210 and the second retention element 215 of the hub 200 include a plurality of holes 220 and 221 drilled or otherwise formed therethrough. Likewise, the polyurethane tire 225 includes holes 227 (see FIG. 2C) formed therethrough corresponding in radial alignment to the holes 220 and 221 in the retention elements 210 and 215.

Optionally, the outer corresponding surface 207 of the annular portion 205 includes serrations 230 or other elements configured to increase static friction between the corresponding surfaces of the polyurethane tire and the hub. The outer corresponding surface 207 refers to the surface of the hub 200 in contact with the inside corresponding surface of the polyurethane tire 225. Such corresponding surfaces are configured to reduce relative movement (e.g. slipping) between the hub and the polyurethane tire. Thus, the polyurethane tires of the invention can be securely mounted and retained without the use of an adhesive layer to bond the polyurethane material to the hub.

The holes in the polyurethane tire 225 and retention elements 210 and 215 accept bolts (e.g. see FIG. 1B) that hold the retention elements and hub together and may or may not cause the polyurethane tire 225 to be compressed. Other means for attaching the retention elements 210 and 215 to the hub 200 may be implemented. For example the retention element 215 and the annular portion 205 can have complementary threads such that the retention element is treaded onto an end of the annular portion 205.

Optionally, conducting sleeves 230 sit in the holes 227 in the polyurethane tire 225, whereby the sleeves 230 surround shafts of the bolts inserted into the holes 220 and 221. Such sleeves 230 improve heat dissipation where the sleeves 230, bolts, and hub 200 may be made of a heat conductive material selected for conducting heat away from the polyurethane tire 225. Additional elements may be included to enhance the dissipation of heat away from the polyurethane tire 225, such as a heat-conducting grease or paste between the hub and the tire.

Wheels incorporating means for releasably mounting a polyurethane tire to a hub such as those described herein may have several advantages over conventional wheels. For example, such embodiments enable independent manufacturing of the polyurethane tire and the hub. This in turn allows for more sophisticated techniques, such as injection molding, to be used to manufacture the polyurethane tire. These wheels reduce waste because the same hub can be reused. Several embodiments exhibit improved dissipation of heat from the polyurethane tires by conducting heat from the polyurethane to the bolts, then to the hub, and finally to the surrounding air.

The manufacture of the polyurethane tire separate from the hub also allows for manufacture of a composite tire according to several embodiments. Such a composite tire can be molded in several distinct processes such that multiple polyurethanes, or combinations of a polyurethane and one or more other polymers are integrated into a single tire. Thus, adjacent portions of the composite tire have varied relative properties depending on the material make-up of each portion of the composite tire. The composite tire can also be manufactured using techniques that are not compatible with manufacturing a wheel upon a hub as for such conventional tires.

Figure 3:
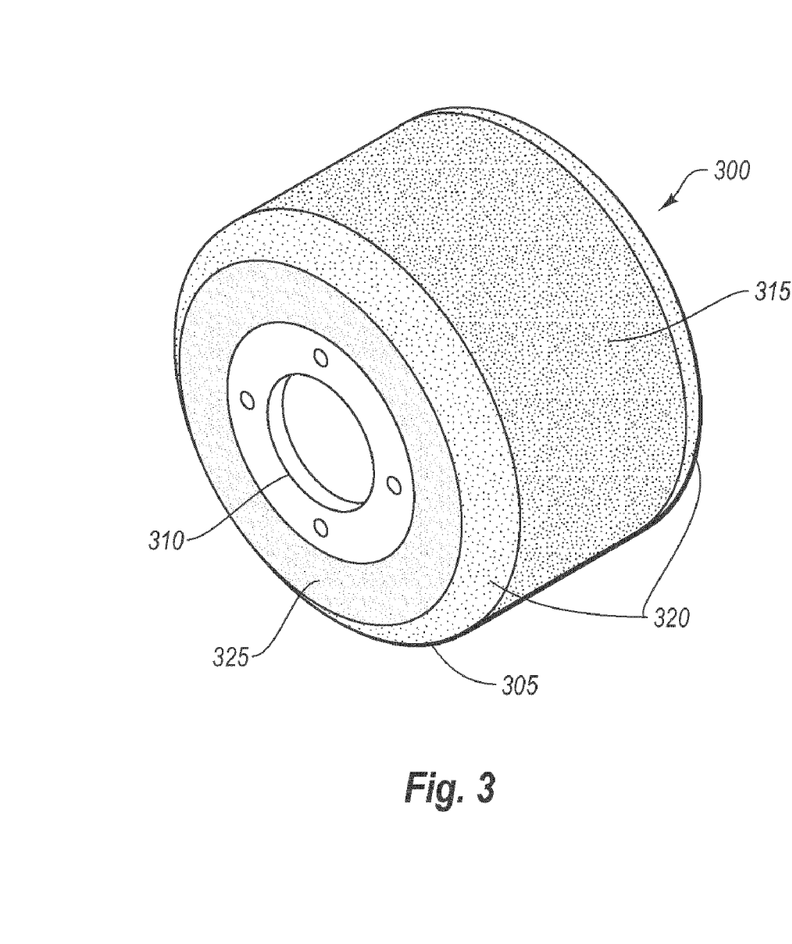
FIG. 3 discloses a wheel including a composite tire, the composite tire including polymers having a variety of different characteristics.

For example, referring to FIG. 3, an example of a composite wheel 300 including a composite polyurethane tire 305. The composite polyurethane tire 305 includes one or more polymers of differing characteristics. According to this embodiment, the polyurethane tire 305 is a composite of three different polymers including a first polymer 315 having a relatively soft characteristic, a second polymer 320 having a relatively hard characteristic that is disposed adjacent to the first polymer 115 and along the outer edges of the wheel 300, and a third polymer 325 that is disposed radially inward from the first and second polymers 315 and 320. The third polymer 325 can be selected for its resiliency in order to provide additional cushioning.

The relative hardness of the first polymer 315 and the second polymer 320 may be determined by a standardized hardness scale, such as the Vickers, Rockwell, Brinell, or Knoop hardness tests, for example. Moreover, the relative hardness may be represented by a hardness number according to one of these hardness tests. The relative resiliency between the first polymer 315, second polymer 320, and the third polymer 325 may be determined by a modulus of resiliency. The modulus of resiliency is a function of Young's modulus associated with the particular polymer. Thus, the first polymer 315, second polymer 320, and third polymer 325 may be manufactured such that they have the desired hardness and resiliency.

Each polymer 315, 320, and 325 can be a polyurethane whose properties tailored by selection of the constituent monomers so as to achieve desired characteristics. The polyurethane tire 305 can also include other polymers integrated with at least one type of polyurethane material to produce the composite tire 305 having non-uniform properties across the polyurethane tire's 305 width, radial length, and/or radius. For example, in one embodiment the portion 325 includes a polyurethane material and portions 315 and/or 320 include a rubber material disposed about a periphery of the portion 325. The portion(s) 315 and/or 320 that include rubber can include a tread pattern and provide additional cushioning for the composite wheel 300 when in use. In another embodiment, one or more of the polymers 315, 320, and 325 includes rubber as filler within a polyurethane material so as to achieve desired characteristics. Thus, the relative characteristics of the different polymers 315, 320, and 325 can be selected to incorporate the benefits of each polymer, or combination of polymers, into an integrated composite tire.

Molding the polyurethane tires separate from the hub broadens the number of molding techniques that can be used to manufacture the polyurethane tire. Examples of suitable techniques for manufacturing the polyurethane tires of the invention include reactive foaming, reactive injection molding (RIM), and reactive spray coating. Injection molding is an example of one manufacturing technique that can be used with the present invention, but cannot typically be used with a process that requires molding the tire on the hub. Compared to traditional techniques for manufacturing polyurethane tires, injection molding can allow for more complex structures, composite designs, and manufacture of the polyurethane tires separate from the hub to which the polyurethane tires are later assembled.

Figure 4:
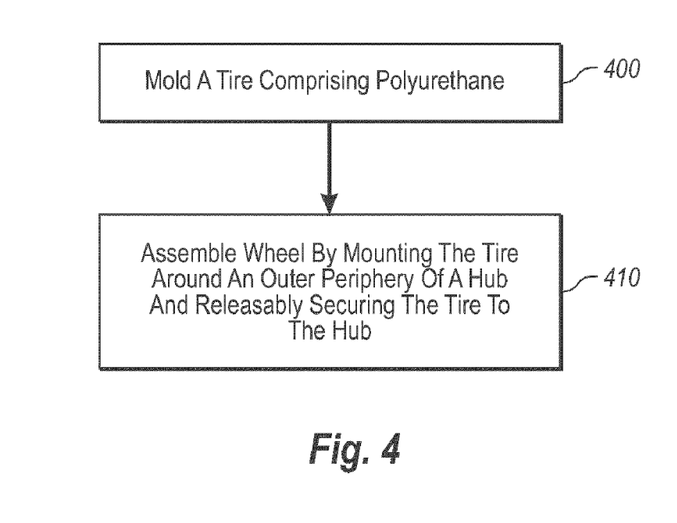
FIG. 4 discloses a method for manufacturing a wheel that includes a polyurethane tire.

For example, referring to FIG. 4, a method for manufacturing a wheel is illustrated. The method includes molding a tire that comprises polyurethane (400). The polyurethane tire has a substantially annular shape having an outer diameter and an inner diameter, for example as shown in FIGS. 1-3.

The polyurethane tire can be molded using an injection molding apparatus and process. For example, polyurethane reactants are injected at high pressure into a mold defining a shape of the polyurethane tire, where the reactants cure. Using such an injection molding process to mold the polyurethane tire presents several advantages over conventional polyurethane tires. For example, more complex tire shapes, such as a tire shape including one of a pair of interlocking elements, may be achieved. In addition, the additional manufacturing processes enable composite polyurethane tires to be manufactured. The act of molding the polyurethane tire can include multiple molding steps for molding multiple polyurethanes, or a combination of one or more polyurethanes and at least one other polymer. Any combination of a polyurethane and other polymers may be incorporated into a composite polyurethane tire and the act of molding the polyurethane tire can include several distinct molding processes conducted in succession. In some embodiments, the polyurethane tire can be a solid polyurethane tire of a single polyurethane material. In many embodiments, the polyurethane tire is substantially devoid of rubber and the process of molding the polyurethane tire does not include a vulcanization process.

As noted above, the chemical and mechanical properties of the polyurethane tires can be tailored by selection of the constituent monomers of the polyurethane. In several embodiments, the polyurethane is a reaction product of a diisocyanate and a polyol. Examples of suitable diisocyanates include toluene diisocyante (TDI), 4,4'-diphenymethane diisocyanate (MDI), p-phenylene diisocyanate (PPDI), 3,3'-dimethyl-f4'-biphenyl diisocyante (TODI), 1,5 naphthalene diisocyanate (NDI), and hexamethlyene diisocyante (HDI). Examples of suitable esters include poly ethylene adipate glycol, poly butylene adipate glycol, poly ethylene butylene adipate glycol, and poly caprolactones. Examples of suitable ethers include polypropylene glycol (PPG) and polytetramethylene ether glycol (PTMEG). Extenders may also be added to modify the properties of the polyurethane. Examples of suitable diol extenders include 1,4-butane diol (BD), hydroquinone bis(2-hydroxy ethyl)ether (HQEE), 1,6 hexane diol, and ethylene glycol. An example of a suitable triol extender is trimethylol propane (TMP). Examples of suitable diamine extenders include methylene bis-orthochloro aniline (MOCA), 1,2 diamino propane, and ethylenediamine.

After the polyurethane tire is molded, the wheel is assembled by mounting the polyurethane tire around an outer corresponding surface of a hub and releasably securing the polyurethane tire to the hub (410). The wheel is releasably secured to the hub by a retention element, for example see FIGS. 1-3.

Figure 5:
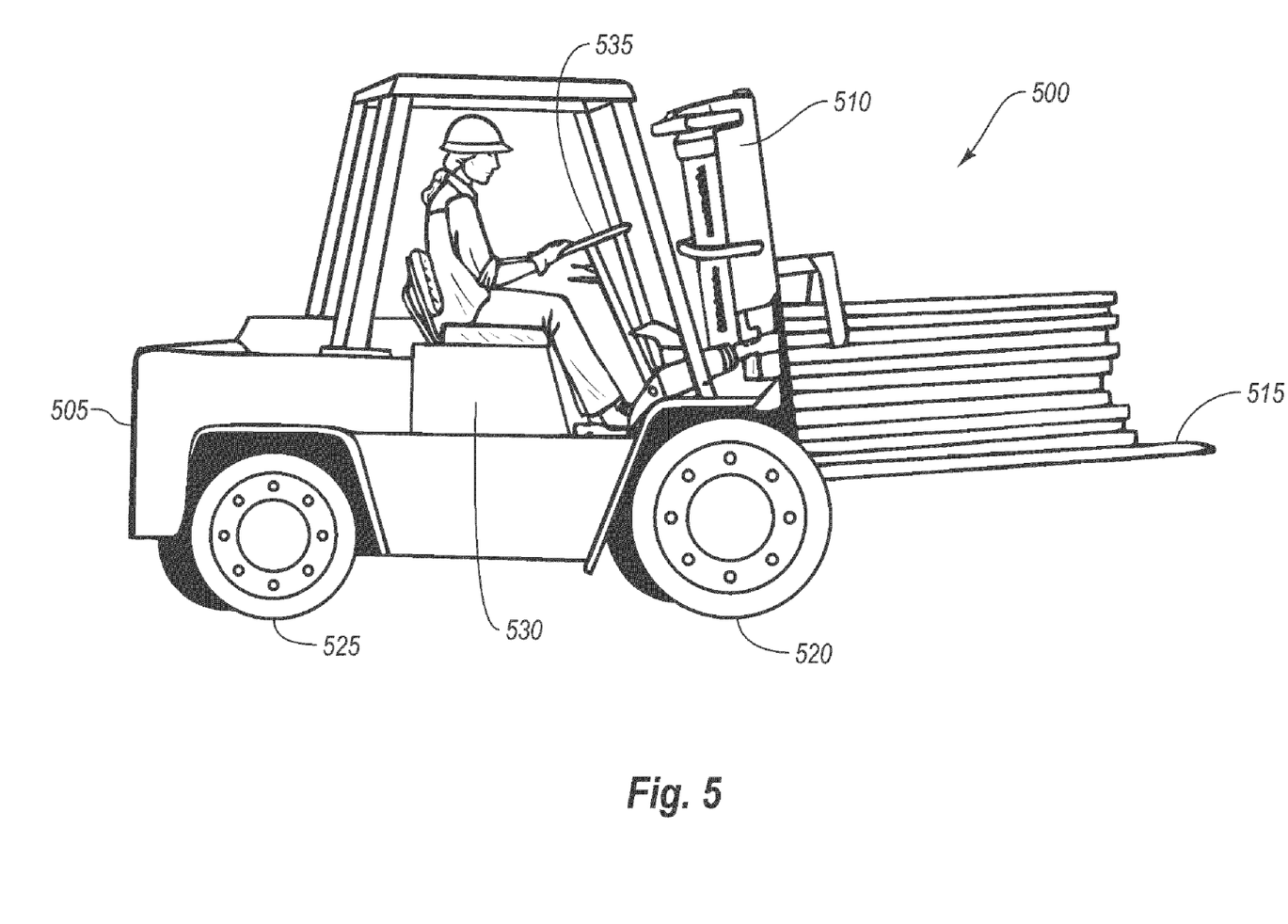
FIG. 5 discloses a lift truck that includes wheels where a polyurethane tire of the wheels are releasably attached to a hub by a retention element.

As described above, the wheels disclosed herein are particularly well suited for use with lift trucks where the use of rubber tires would suffer from several deleterious effects due to the inherent properties of rubber and the constraints of the operating environment. For example, referring to FIG. 5, a lift truck 500 is illustrated incorporating one embodiment of the polyurethane tires disclosed herein. The lift truck 500 includes a frame 505, a fork tower 510 mounted on the frame 505, two forks 515 coupled to the fork tower 510 for vertical movement and angular tilting of the forks 515. The lift truck 500 further includes two front wheels 520 (only one is shown) coupled to the front of the frame 505 to support the front of the frame 505. The lift truck 500 further includes two rear wheels 525 pivotally coupled to the rear of the frame 505 to support the rear of the frame 505. The wheels 520 and 525 may be any embodiments disclosed herein (e.g. see FIGS. 1-3). The lift truck 500 can include a motor 530 supported by the frame 500 and coupled to at least one of the wheels 520 and 525 to propel the lift truck 500. The motor 530 may be an electrical motor. The motor 530 may also be a fuel powered engine. The lift truck 500 further includes steering means 535 coupled to the frame 505 for pivoting the rear wheels 525 to steer the lift truck 500. The wheels disclosed herein may be used with other types of vehicles and are not limited to applications in conjunction with lift trucks, however.

The wheels disclosed herein can come in a variety of sizes. For example, wheels disclosed herein for use with lift trucks can have an outer tire diameter between about 8 inches and 36 inches, a tire width between about 4.5 and 16 inches, and an inner tire diameter and outer hub diameter both between about 4.5 and 30 inches. The wheels can be rated for loads between about 1000 and 35,000 pounds. In some embodiments, the tires can be solid polyurethane tires designed for loads of at least about 2000 pounds at maximum vehicle velocities of 6 or 10 miles-per-hour. Such wheels may be quite heavy, for example as heavy as 25-300 pounds, or heavier, in which case the inventive wheels disclosed herein are particular advantageous because of the improved manufacturability and ability to reuse the large hubs associated with such wheels.

The wheels disclosed herein can also be designed for non-powered vehicles, such as non-powered trucks and trailers for use on smooth floors and runways. Wheels for use with non-powered vehicles can have an outer tire diameter of between about 4 and about 12 inches and a width of between about 2 and about 6 inches with a maximum load rating of at least 400 lbs. However, for the reasons given above, the inventive wheels are particularly advantageous when used in conjunction with electric lift trucks weighing about 2000 pounds or more.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. The subject matter claimed herein is not limited to embodiments that solve any particular disadvantages or that operate only in particular environments such as those described herein.

Rather, such environments and disadvantages are provided only to illustrate examples of technology areas in which several embodiments may be practiced.

What is claimed is:

1. A wheel for supporting an industrial vehicle, comprising:
    an annular tire formed of polyurethane, the tire having a substantially cylindrical inner surface, the inner surface including axially-parallel keys, the keys having a consistent width extending in a direction parallel to the axis of the wheel and not extending to an outer-tire-edge; and
    a hub engaging the inner surface, including:
        an annular portion having axially-parallel slots, the slots substantially shaped as the negative of the shape of the keys to facilitate interaction with the keys when the tire is received about the annular portion of the hub; and
        a retention element configured to removably attach to the hub thereby retaining the tire about the annular portion of the hub, the retention element including a first plate and a second plate, each plate being configured to removably attach to opposite sides of the hub and extend over a portion of a tire sidewall when affixed to the sides of the hub;
    wherein the tire and hub arc secured together through interaction of the keys and the slots.

2. A wheel according to claim 1 further comprising a bolt, wherein each plate includes a hole through which the bolt is configured to extend, the bolt attaching each plate directly to the hub.

3. A wheel according to claim 1 wherein the plates when affixed to the sides of the hub abut the keys.

4. A wheel according to claim 1 further comprising a surface on the tire corresponding to a surface on the hub, wherein the corresponding surfaces of the tire and hub are configured to oppose relative motion between the tire and the hub.

5. A wheel according to claim 4 wherein the corresponding surfaces include a non-uniform outer surface about the annular portion of the hub.

6. A wheel according to claim 5, wherein the non-uniform outer surface includes serrations.

7. A wheel according to claim 1 wherein the tire is substantially devoid of rubber.

8. A wheel according to claim 1 wherein the tire is a solid tire consisting of polyurethane.

9. A wheel according to claim 1 wherein the tire is a composite tire that includes multiple polyurethanes or, a combination of a polyurethane and at least one other polymer, wherein at least two polymers have different resilience properties.

10. A wheel according to claim 9 wherein the tire includes a first polymer adjacent to a second polymer.

11. A wheel according to claim 10 wherein the first polymer is radially adjacent to the second polymer.

12. A wheel according to claim 11 wherein the first polymer includes rubber and the second polymer includes a polyurethane.

13. A wheel according to claim 1 wherein the wheel is substantially free of an adhesive layer between the hub and tire.

14. A wheel according to claim 1 wherein the wheel is configured to support the industrial vehicle weighting at least about 400 pounds.

15. A wheel according to claim 1 wherein the wheel is configured to support the industrial vehicle weighting at least about 2000 pounds.

16. A wheel according to claim 1 wherein the wheel further includes holes sized and arranged to receive lugs for attaching the wheel to an axle of the vehicle.

17. A vehicle comprising:
    a frame;
    a fork tower mounted on the frame;
    at least one fork coupled to the fork tower for vertical movement of the at least one fork;
    two front wheels according to claim 1 coupled to the frame adjacent the front of the frame to support the front of the frame,
    two rear wheel according to claim 1 pivotally coupled to the frame adjacent the rear of the frame to support the rear of the frame;
    a motor supported by the frame, the motor coupled to at least one of the wheels to provide a drive force;
    steering means connected to the frame for pivoting the rear wheels to steer the vehicle.

18. A wheel configured to support a lift truck, comprising:
    a tire at least partially formed of polyurethane and configured to support at least about 1000 pounds the tire having a substantially cylindrical inner surface, the inner surface including axially-parallel keys, the keys having a consistent width extending in a direction parallel to the axis of the wheel and not extending to an outer-tire-edge;
    a hub engaging the inner surface and including:
        an annular portion having axially-parallel slots, the slots substantially shaped as the negative of the shape of the key to facilitate interaction with the key when the tire is received about the annular portion of the hub; and
        a retention element configured to removably attach to the hub thereby removably retaining the tire about the annular portion of the hub, the retention element including a first plate and a second plate, each plate being configured to removably attach to opposite sides of the hub and extend over a portion of a tire sidewall when affixed to the sides of the hub; and
    a surface on the tire corresponding to a surface on the hub, wherein the corresponding surfaces of the tire and the hub are configured to oppose relative motion between the tire and the hub when the wheel is in use in conjunction with the lift truck.

19. A wheel according to claim 18, wherein the surface on the hub includes serrations.

* * * * *